(12) United States Patent
Fenn et al.

(10) Patent No.: US 7,386,999 B2
(45) Date of Patent: Jun. 17, 2008

(54) DEFECT CONTROL IN THE MAKING OF SHEET GLASS BY THE FUSION PROCESS

(75) Inventors: Philip M. Fenn, Corning, NY (US); John T. Fisk, Elmira Heights, NY (US); Randy L. Rhoads, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 283 days.

(21) Appl. No.: 10/318,268

(22) Filed: Dec. 12, 2002

(65) Prior Publication Data

US 2003/0110804 A1    Jun. 19, 2003

Related U.S. Application Data

(60) Provisional application No. 60/341,199, filed on Dec. 14, 2001.

(51) Int. Cl.
*C03B 17/06* (2006.01)
(52) U.S. Cl. .................. 65/195; 65/90; 65/53
(58) Field of Classification Search ............ 65/53, 65/90, 121, 126, 134.9, 135.1, 195, 324, 65/325, 346
See application file for complete search history.

(56) References Cited

U.S. PATENT DOCUMENTS

| | | | |
|---|---|---|---|
| 3,338,696 A | | 8/1967 | Dockerty |
| 3,682,609 A | | 8/1972 | Dockerty |
| 4,145,200 A | * | 3/1979 | Yamazaki et al. ............. 65/405 |
| 4,919,700 A | * | 4/1990 | Pecoraro et al. ............ 65/134.2 |
| 4,980,091 A | * | 12/1990 | Joutel ........................... 588/11 |
| 5,374,595 A | | 12/1994 | Dumbaugh, Jr. et al. |
| 6,319,867 B1 | | 11/2001 | Chacon et al. |
| 6,802,189 B2 | * | 10/2004 | Langsdorf et al. ............. 65/21.2 |
| 6,889,526 B2 | * | 5/2005 | Pitbladdo ........................ 65/53 |
| 7,155,935 B2 | * | 1/2007 | Pitbladdo ........................ 65/53 |
| 2003/0029199 A1 | * | 2/2003 | Pitbladdo ....................... 65/195 |

FOREIGN PATENT DOCUMENTS

| | | |
|---|---|---|
| JP | 9-110443 | 4/1997 |
| JP | 2001-080922 | 3/2001 |
| WO | WO 01/85630 | 11/2001 |

OTHER PUBLICATIONS

Varshneya, Arun K., "Flat Glass," *Fundamentals of Inorganic Glasses,* Academic Press, Inc., Boston, 1994, Chapter 20, Section 4.2., 534-540.

English language translation of Japanese Patent Publication No. 2001-080922.

* cited by examiner

*Primary Examiner*—Steven P. Griffin
*Assistant Examiner*—Queenie Dehghan
(74) *Attorney, Agent, or Firm*—Maurice M. Klee; Vernon E. Williams

(57) ABSTRACT

A molten glass delivery system for use in producing sheet glass by a fusion process is provided. The delivery system includes a first conduit (9) which surrounds a portion of a second conduit (19) with a free surface (21) of molten glass (31) being formed between the two conduits. The first (9) and second (19) conduits are positioned with respect to one another so that the spatial relationship between the exit end (20) of the second conduit (19) and the free surface (21) results in neither substantial numbers of devitrification defects (27, 29) nor substantial numbers of blister defects (35) in finished sheets of devitrification sensitive glass, e.g., high silica LCD glass.

27 Claims, 16 Drawing Sheets

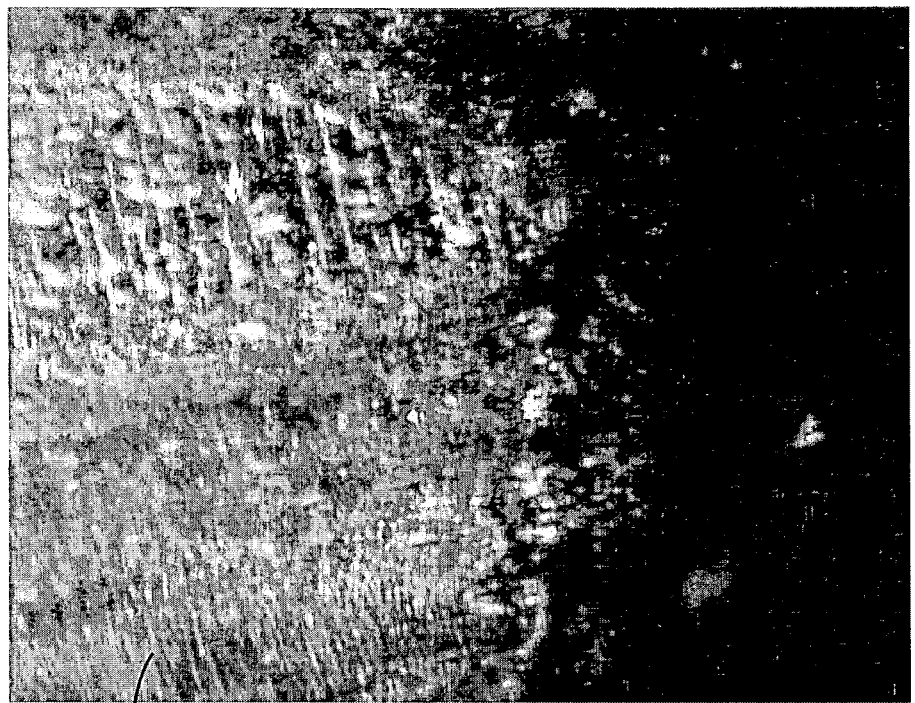
27 FIG. 7C
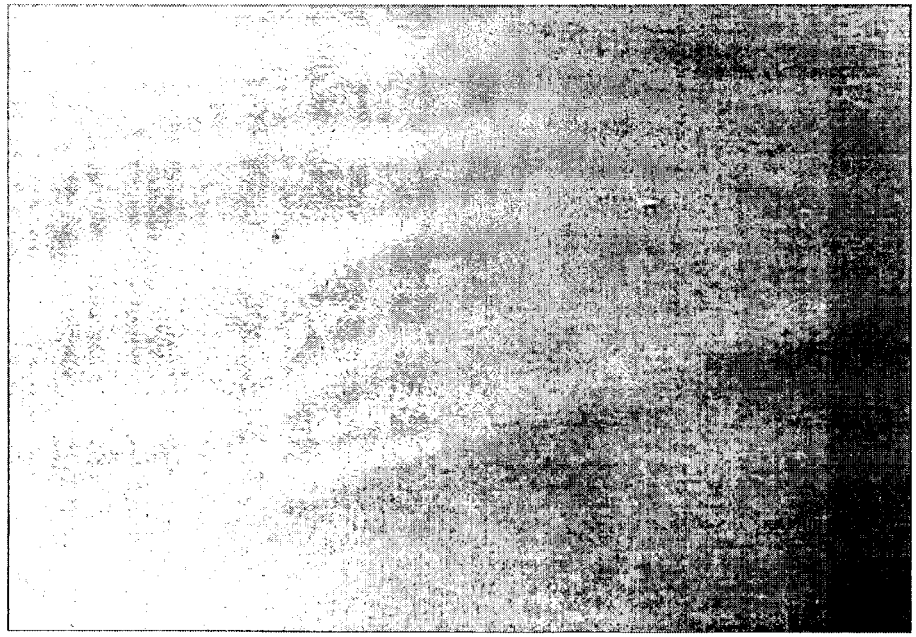
FIG. 7D

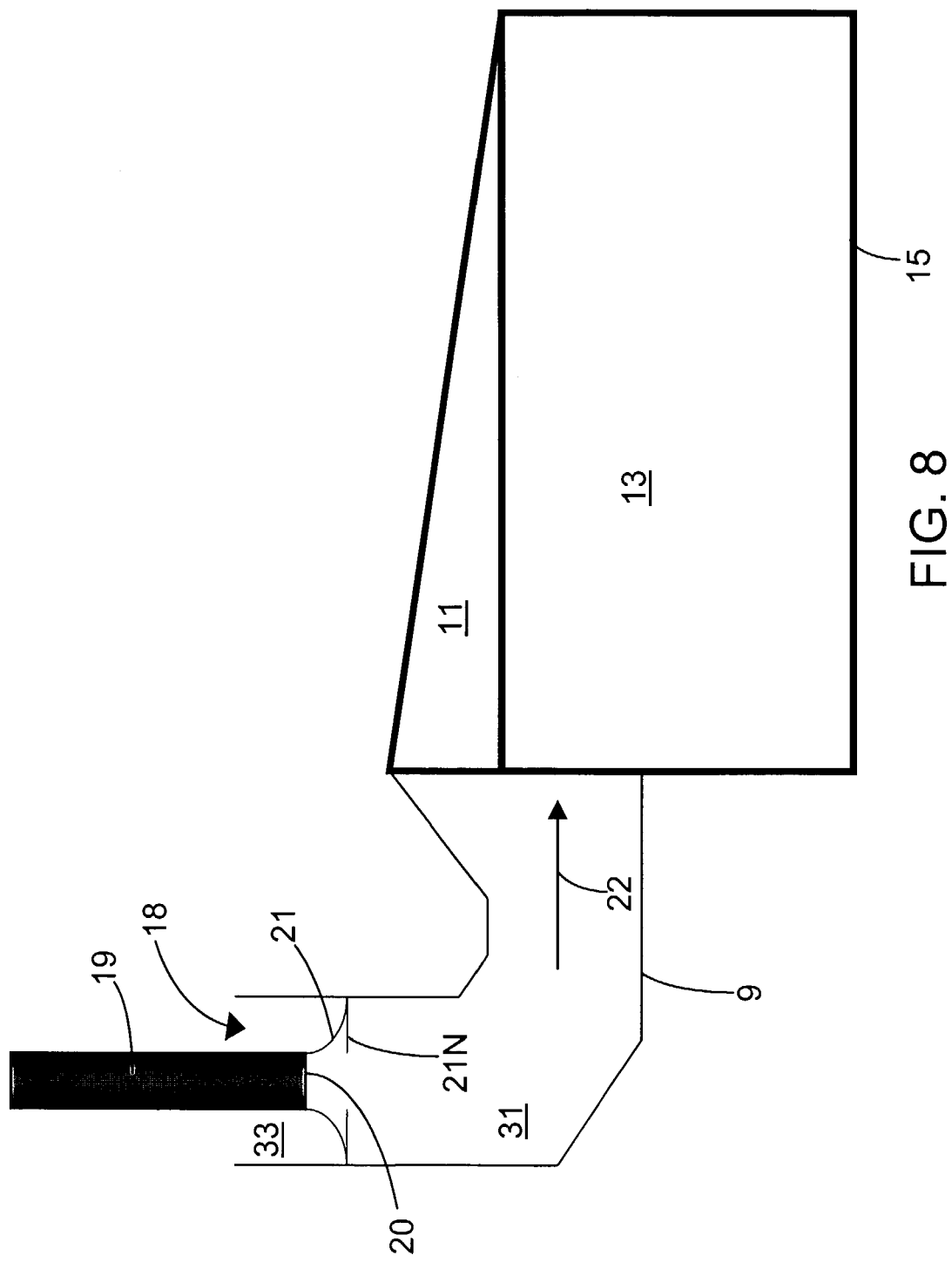

35

DEFECT CONTROL IN THE MAKING OF SHEET GLASS BY THE FUSION PROCESS

FIELD OF THE INVENTION

This invention relates to the production of sheet glass by the fusion process and, in particular, to techniques for controlling the formation of devitrification defects in glass made by this process. The techniques are particularly useful when the fusion process is employed to produce high silica glass sheets (e.g., glass sheets having a weight percent of silica of at least 60%) which are designed for use as substrates in the manufacture of liquid crystal displays, e.g., AMLCDs.

BACKGROUND OF THE INVENTION

A. The Fusion Process

The fusion process is one of the basic techniques used in the glass making art to produce sheet glass. See, for example, Varshneya, Arun K., "Flat Glass," *Fundamentals of Inorganic Glasses,* Academic Press, Inc., Boston, 1994, Chapter 20, Section 4.2., 534–540. Compared to other processes known in the art, e.g., the float and slot draw processes, the fusion process produces glass sheets whose surfaces have superior flatness and smoothness. As a result, the fusion process has become of particular importance in the production of the glass substrates used in the manufacture of liquid crystal displays (LCDs).

The fusion process, specifically, the overflow downdraw fusion process, is the subject of commonly assigned U.S. Pat. Nos. 3,338,696 and 3,682,609, to Stuart M. Dockerty, the contents of which are incorporated herein by reference. A schematic drawing of the process of these patents is shown In FIG. 1. As illustrated therein, the system includes a supply pipe 9 which provides molten glass to a collection trough 11 formed in a refractory body 13 known as an "isopipe."

Once steady state operation has been achieved, molten glass passes from the supply pipe to the trough and then overflows the top of the trough on both sides, thus forming two sheets of glass that flow downward and then inward along the outer surfaces of the isopipe. The two sheets meet at the bottom or root 15 of the isopipe, where they fuse together into a single sheet. The single sheet is then fed to drawing equipment (represented schematically by arrows 17), which controls the thickness of the sheet by the rate at which the sheet is drawn away from the root. The drawing equipment is located well downstream of the root so that the single sheet has cooled and become rigid before coming into contact with the equipment.

As can be seen in FIG. 1, the outer surfaces of the final glass sheet do not contact any part of the outside surface of the isopipe during any part of the process. Rather, these surfaces only see the ambient atmosphere. The inner surfaces of the two half sheets which form the final sheet do contact the isopipe, but those inner surfaces fuse together at the root of the isopipe and are thus buried in the body of the final sheet. In this way, the superior properties of the outer surfaces of the final sheet are achieved.

In a commercial setting, the location and inclination of isopipe 13 needs to be adjustable with respect to the equipment used to melt and refine the raw ingredients from which the glass sheet is made. Although theoretically such adjustability could be achieved in a system in which the connection between the melter/finer and the fusion system was completed closed (i.e., a system in which entire feed system to the isopipe was filled with molten glass), in practice, adjustability is achieved by connecting the melter/finer to the fusion system by forming a free surface of molten glass.

FIGS. 2 and 3 illustrate such a connection, where as above, 9 is the supply pipe to isopipe 13, 19 is the exit from the melter/finer system (referred to herein as a "downcomer" since it preferably has a substantially vertical (downward) orientation), arrow 22 shows the direction of flow of molten glass 31, and 21 is the free surface of the molten glass, the height of which relative to the height of molten glass in the isopipe's trough 11 is determined by (1) the rate of flow of molten glass out of the downcomer and (2) the resistance to fluid flow of the supply pipe/isopipe combination. As can be seen in these figures, because the characteristic cross-sectional dimension of downcomer 19 (e.g., the diameter of the downcomer) is smaller than the characteristic cross-sectional dimension of supply pipe 9 (e.g., the diameter of the entrance 18 to the supply pipe), the downcomer and supply pipe can be readily moved relative to one another. In this way, the desired adjustability between the melter/finer and the fusion system is achieved.

It should be noted that for a downcomer whose exit end 20 is submerged in molten glass, the height of free surface 21 relative to the height of molten glass in trough 11 is relatively insensitive to changes in the depth of submersion of the exit end. To provide a spatial reference for describing the invention, the phrase "nominal free surface" is used herein to indicate the location of free surface 21 when exit end 20 is just submerged in the molten glass. The reference number 21N is used to identify the nominal free surface.

For essentially any practical submersion of the exit end of the downcomer, the nominal free surface and the actual free surface will be at essentially the same location. Accordingly, in FIGS. 2 and 3 both reference number 21 and reference number 21N are used to identify the interface between molten glass 31 and the surrounding atmosphere 33 (typically air).

It should also be noted that because supply pipe 9 (as well as downcomer 19) are made of opaque refractory materials (e.g., platinum or a platinum alloy), neither the actual free surface nor the nominal free surface of the molten glass can be visually observed. However, their locations can be accurately estimated using physical modeling (e.g., oil modeling). In this connection, it should be noted that the free surfaces 21 shown in the figures and, in particular, in FIGS. 8–9 and 11–12, are simplified drawings for purposes of illustration, it being understood that the actual free surfaces will have more complex shapes as a result of the molten glass transitioning from a smaller diameter conduit to a larger diameter conduit at a free surface. Further, knowledge of the exact locations/configurations of the actual free surface and the nominal free surface is not needed to practice the invention since, as explained in detail below, by examining the finished glass for defects, specifically, for devitrification and blister defects, one can determine if the spatial relationship between the downcomer and the molten glass is within the operative range defined by the invention.

B. LCD Glasses

Corning Incorporated, the assignee of this application, has sold glass sheets for use as substrates in the manufacture of liquid crystal displays under the trademarks 1737 and EAGLE 2000. See, U.S. Pat. No. 5,374,595 to Dumbaugh, Jr. et al. and U.S. Pat. No. 6,319,867 to Chacon et al., respectively, the relevant portions of which are incorporated herein by reference.

EAGLE 2000 glass has a silica content of approximately 63.3 wt. %, while 1737 glass has a silica content of approximately 57.8 wt. %. Because of its higher silica content, EAGLE 2000 has a greater tendency to devitrify than 1737, e.g., to form cristobalite, the high temperature crystalline form of silica.

To address EAGLE 2000's greater tendency to devitrify, its formulation includes a higher percentage of boron oxide ($B_2O_3$), specifically, approximately 10.3 wt. % $B_2O_3$ for EAGLE 2000 versus approximately 8.4 wt. % for 1737.

Notwithstanding this higher level of $B_2O_3$, during trial manufacturing runs, considerable cristobalite devitrification was observed when EAGLE 2000 glass was manufactured using equipment which previously had successfully produced 1737 glass without the generation of high levels of devitrification. The devitrification of EAGLE 2000 glass was first observed in the compression beads at the edges of the glass sheet (i.e., the beads engaged by the drawing equipment) and eventually throughout the glass sheet, including the quality portion of the sheet intended ultimately to form the LCD substrate.

The present invention is concerned with identifying the source of this devitrification and with providing methods and apparatus for eliminating this defect without introducing other defects (specifically, blister defects) into the finished glass sheets.

SUMMARY OF THE INVENTION

In accordance with a first aspect, the invention provides a molten glass delivery system for use in producing sheet glass by a fusion process comprising:

(a) a first conduit (9) which has a first characteristic cross-sectional dimension (e.g., a cross-sectional diameter of about 8.5 inches); and (b) a second conduit (19) which has an exit end (20) and a second characteristic cross-sectional dimension (e.g., a cross-sectional diameter of about 3.5 inches);

wherein:

(i) the first conduit (9) receives molten glass from the second conduit (19);

(ii) a portion of the first conduit (9) surrounds a portion of the second conduit (19);

(iii) the first characteristic cross-sectional dimension is larger than the second characteristic cross-sectional dimension so that a free surface (21) of molten glass (31) is formed between the first and second conduits; and (iv) the first (9) and second (19) conduits are positioned relative to one another (e.g., by moving the first conduit or by moving the second conduit or by moving both the first and second conduits) so that the spatial relationship between the exit end (20) of the second conduit (19) and the free surface (21) of the molten glass (31) results in neither substantial numbers of devitrification defects (27, 29) (e.g., commercially unacceptable numbers of devitrification defects) nor substantial numbers of blister defects (35) (e.g., commercially unacceptable numbers of blister defects) in the finished sheet glass for a glass that is devitrification sensitive (e.g., a glass which comprises at least 60 wt. % $SiO_2$ and/or at least 9 wt. % $B_2O_3$).

In accordance with a second aspect, the invention provides a method for providing molten glass to apparatus (11, 13, 15) which produces sheet glass by a fusion process, said method comprising:

(a) providing a first conduit (9) which has a first characteristic cross-sectional dimension;

(b) providing a second conduit (19) which has an exit end (20) and a second characteristic cross-sectional dimension, said second characteristic cross-sectional dimension being smaller than said first characteristic cross-sectional dimension;

(c) nesting a portion of the second conduit (19) within a portion of the first conduit (9);

(d) flowing molten glass out of the second conduit (19) and into the first conduit (9), said molten glass forming a free surface (21) between the first and second conduits; and (e) selecting the relative locations of the first (9) and second (19) conduits so that the spatial relationship between the exit end (20) of the second conduit (19) and the free surface (21) of the molten glass (31) results in neither substantial numbers of devitrification defects nor substantial numbers of blister defects in the finished sheet glass for glass that is devitrification sensitive.

Step (e) of the second aspect of the invention is preferably performed by:

(i) moving the first (9) and second (19) conduits apart (away from one another) so that the exit end (20) of the second conduit (19) is sufficiently above a nominal free surface (21N) of the molten glass (31) so that substantial numbers of blister defects appear in the finished sheet glass; and (ii) moving the first (9) and second (19) conduits together (towards one another) until substantial numbers of blister defects no longer appear in the finished sheet glass.

Even more preferably, step (e) also includes the further step of moving the first (9) and second (19) conduits together (towards one another) beyond the point where substantial numbers of blister defects no longer appear in the finished sheet glass but not so far as to cause substantial numbers of devitrification defects to appear in the finished sheet glass for glass that is devitrification sensitive. It should be noted that devitrification defects normally take some time to develop so that one will have to observe the finished glass for a period of time to determine if the conduits have been moved too close together. Blister defects, on the other hand, develop rapidly when the conduits are too far apart.

The "moving" of the first and second conduits in the preferred procedures for performing step (e) can be achieved by moving the first conduit, the second conduit, or both the first and second conduits. Typically, just the second conduit will be moved.

The reference numbers used in the above summaries of the first and second aspects of the invention are for the convenience of the reader and are not intended to and should not be interpreted as limiting the scope of the invention. More generally, it is to be understood that both the foregoing general description and the following detailed description are merely exemplary of the invention, and are intended to provide an overview or framework for understanding the nature and character of the invention as it is claimed.

BRIEF DESCRIPTION OF THE DRAWINGS

FIGS. 7C and 7D are photomicrographs of the top surfaces of samples of EAGLE 2000 and 1737 glass, respectively, after a heat treatment at 1300° C. for 96 hours.

FIG. 8 is a schematic diagram illustrating the junction between a downcomer and a supply pipe where the exit end of the downcomer is above the nominal free surface of the molten glass in the supply pipe.

Figure 1:
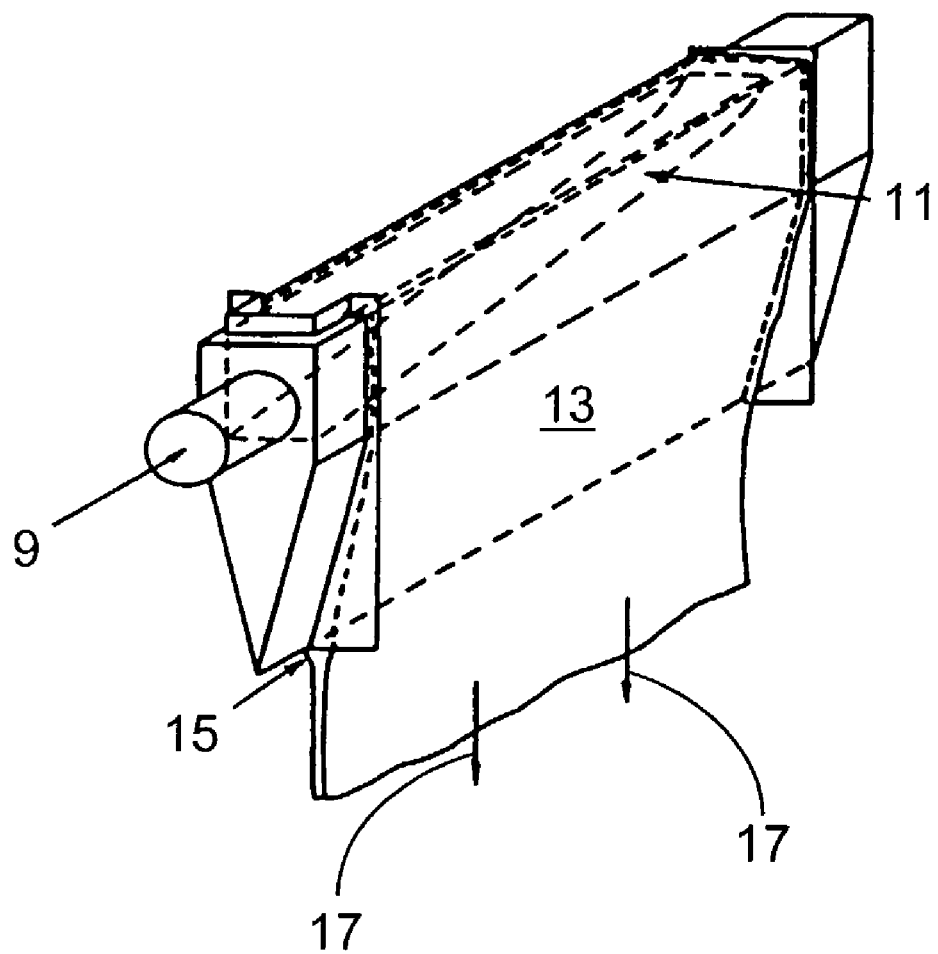
FIG. 1 is a schematic drawing illustrating a representative construction for a supply pipe and an isopipe for use in an overflow downdraw fusion process for making flat glass sheets.
Figure 2:
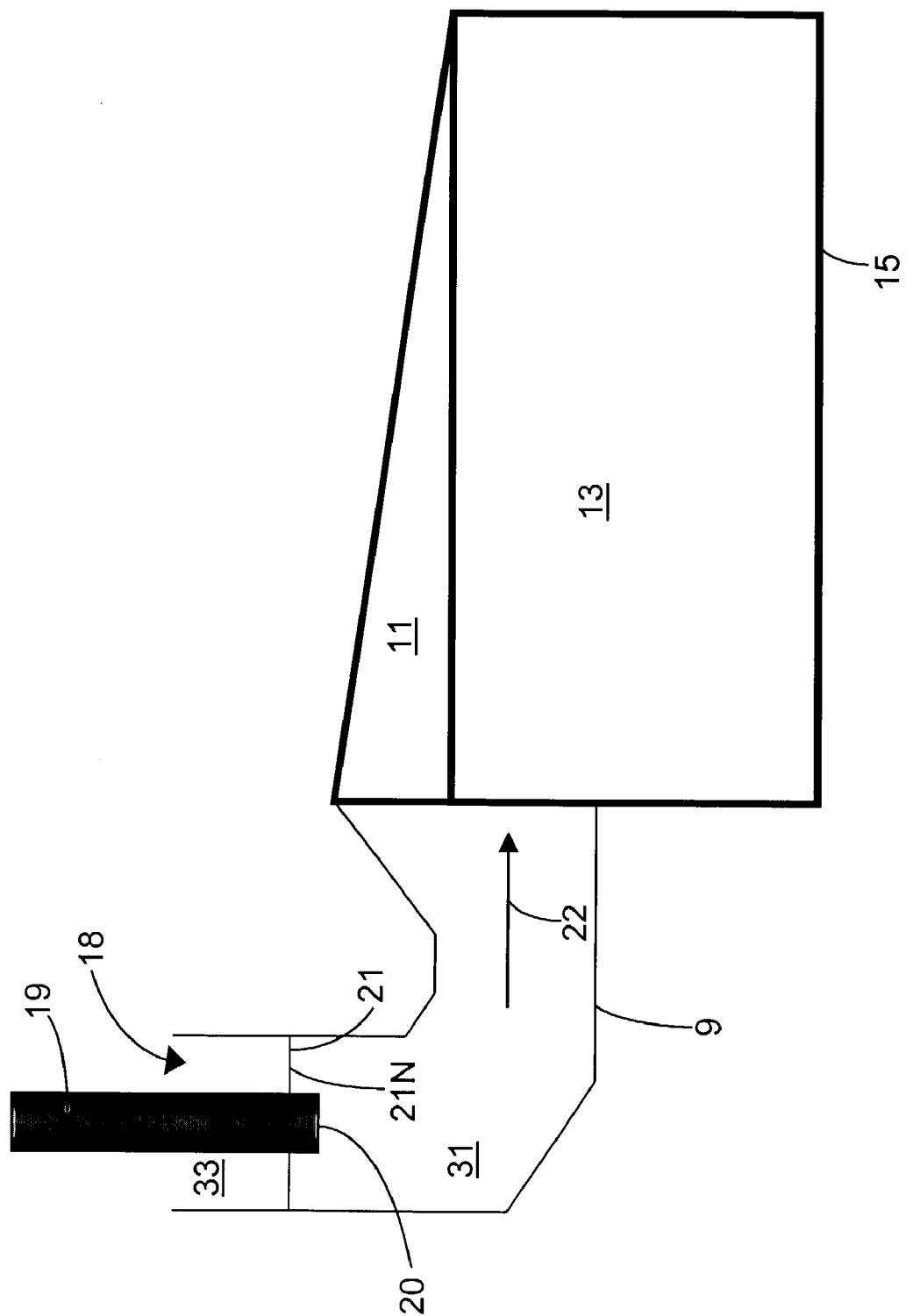
FIG. 2 is a schematic diagram illustrating the junction between a downcomer and a supply pipe where the exit end of the downcomer is below the nominal free surface of the molten glass in the supply pipe.
Figure 3:
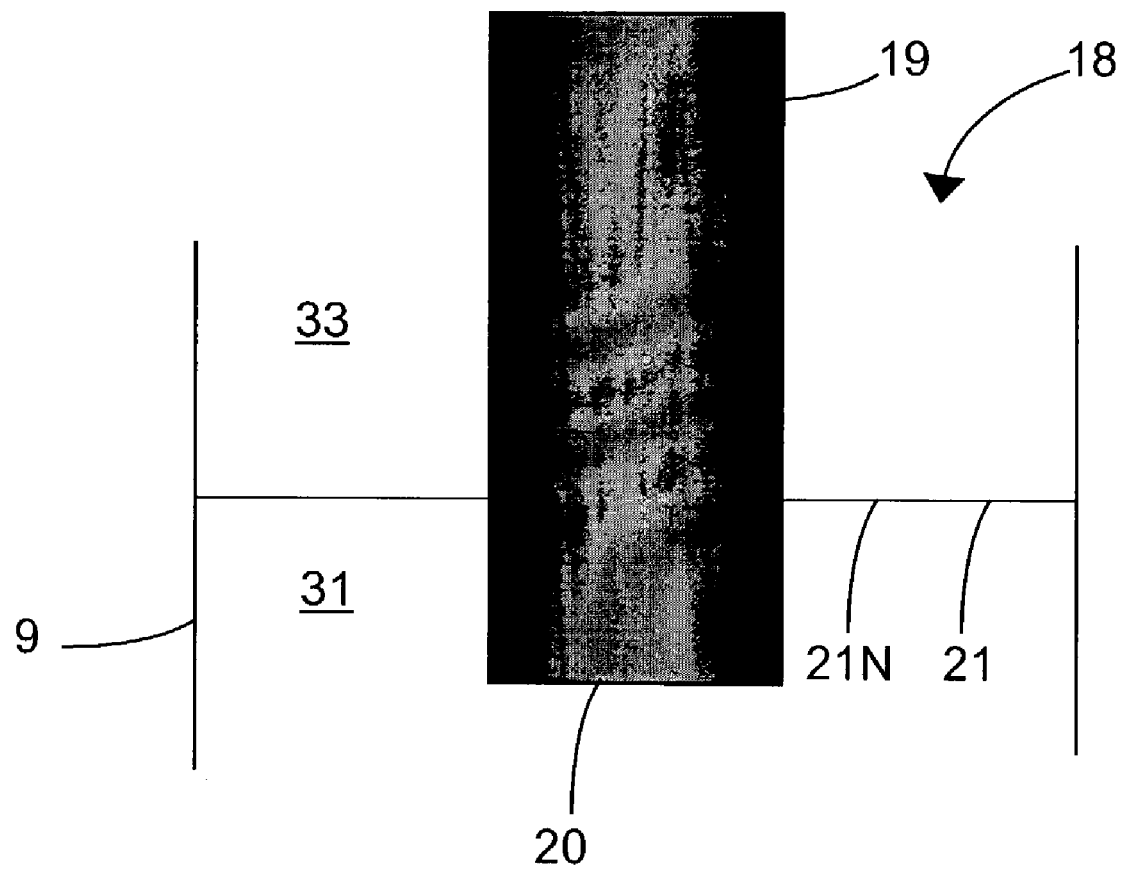
FIG. 3 is an expanded view of the junction between the downcomer and the supply pipe of FIG. 2.

The foregoing drawings, which are incorporated in and constitute part of the specification, illustrate various embodiments of the invention, and together with the description, serve to explain the principles of the invention. It is to be understood, of course, that both the drawings and the description are explanatory only and are not restrictive of the invention.

The reference numbers used in the drawings correspond to the following:
9 supply pipe
11 collection trough
13 isopipe
15 root of isopipe
17 arrows schematically indicating drawing equipment
18 entrance to supply pipe
19 downcomer
20 exit end of downcomer
21 actual free surface of molten glass
21N nominal free surface of molten glass
22 arrow indicating glass flow in supply pipe
23 sample of EAGLE 2000 glass
25 support for sample of EAGLE 2000 glass
27 cristobalite crystal
29 sac surrounding cristobalite crystal
31 molten glass in supply pipe
33 atmosphere above free surface
35 blister defect

DETAILED DESCRIPTION OF THE INVENTION

Figure 4:
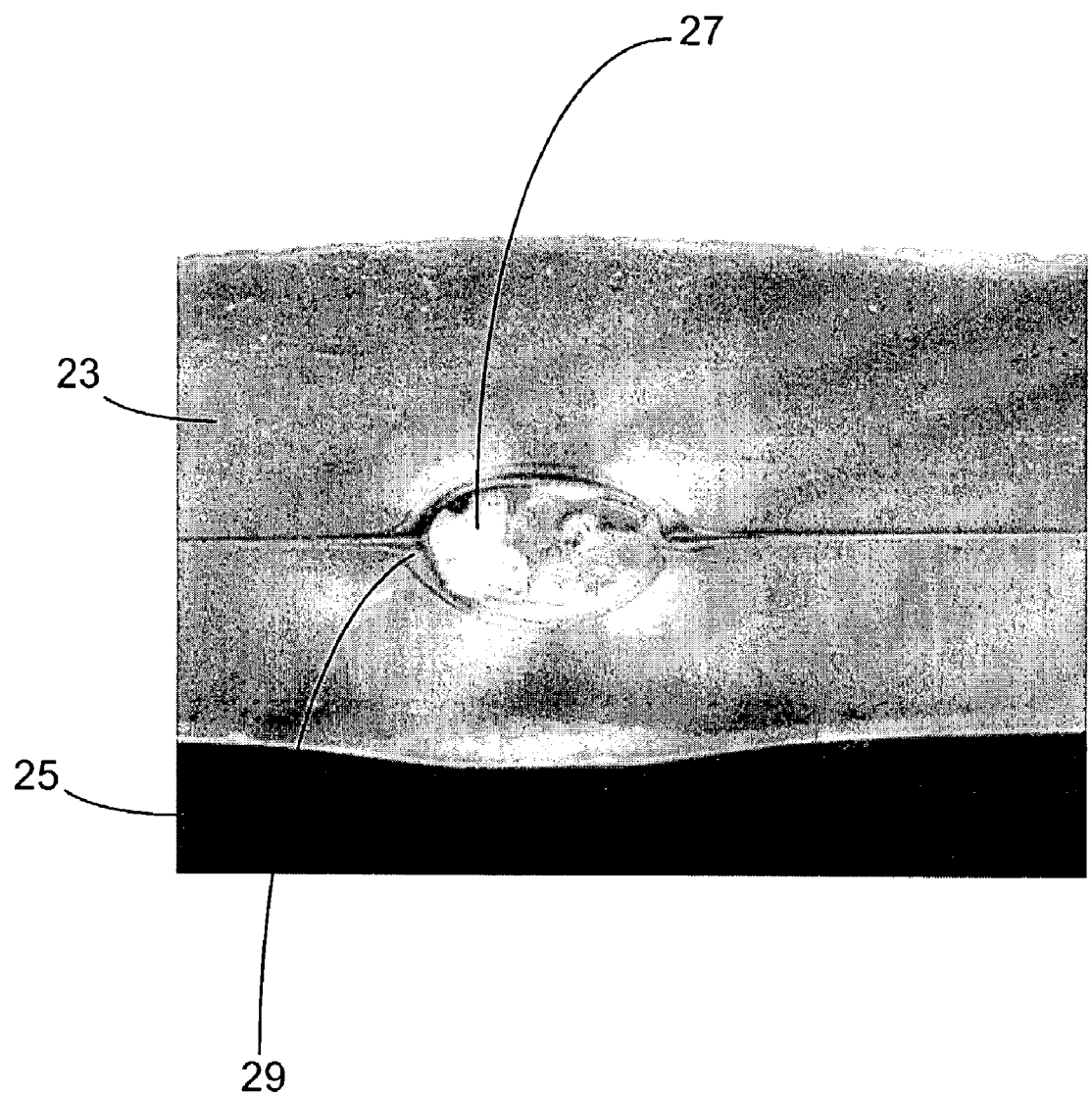
FIG. 4 is a photomicrograph of a crystalline defect (devitrification defect) of the type which the present invention addresses.

FIG. 4 is a photomicrograph of a cristobalite crystal of the type that was observed when EAGLE 2000 glass was processed into glass sheets (thickness=0.63 millimeters) using equipment which previously had successfully processed 1737 glass without serious devitrification problems. The reference numbers used in this figure refer to the following:

23—EAGLE 2000 glass; 25—support used in preparing photomicrograph; 27—cristobalite crystal; and 29—sac surrounding cristobalite crystal. As can be seen in this figure, in addition to constituting an internal defect, the cristobalite crystal has also affected the flatness of the outer surfaces of the glass sheet.

Analysis of sac 29 revealed silica enrichment and boron depletion in the residual glass. In accordance with the invention, this observation was interpreted as indicating the source of the devitrification as something other than normal devitrification of EAGLE 2000 glass resulting from cooling of the glass below its liquidus temperature. In particular, this observation was interpreted as indicating highly silica-enriched glass as the source of the devitrification.

In addition to the sac analysis, a high level of devitrification of EAGLE 2000 glass was observed during a trial run after a translation of isopipe 13 and supply pipe 9 with respect to downcomer 19. This observation led to the hypothesis that the source of the devitrification was free surface 21 at the junction between the downcomer and the supply pipe.

To test this hypothesis, laboratory experiments were performed to determine if stagnant EAGLE 2000 glass behaved differently from stagnant 1737 glass. The experiments were performed as follows. Samples of 1737 and EAGLE 2000 glasses were cut, cleaned, and stacked to a depth of approximately five millimeters in rectangular platinum crucibles whose dimensions were 45 millimeters by 40 millimeters by 10 millimeters deep. This geometry provided considerable surface area to avoid edge effects caused by contact of the glass with the crucible's walls and was shallow enough to reduce the impact of any vertical mixing due to density or thermal gradients.

The crucibles were placed in a resistance heated furnace at 1200° C., 1250° C., and 1300° C. for periods of 2, 4, and 8 days. After the heat treatment, samples were cut from the center of each crucible, potted in epoxy, and polished for chemical analysis with an electron microprobe instrument. Analyses were performed at 50 micrometer intervals from a point 40 micrometers below the surface to a depth of 2.49 millimeters. Well-characterized 1737 glasses were used to calibrate the instrument.

Figure 5A:
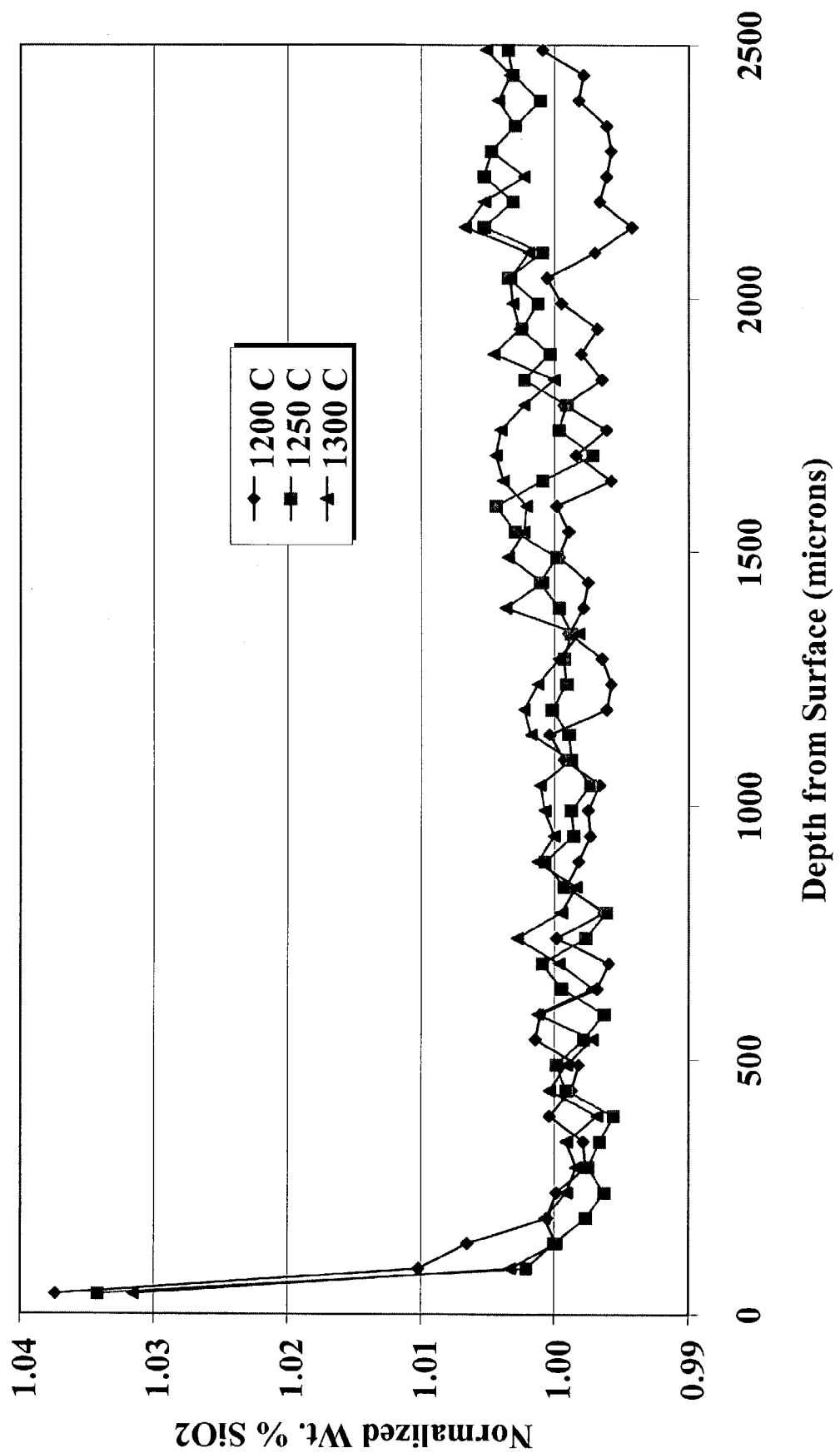
FIGS. 5A and 5B are plots showing surface enrichment of $SiO_2$ for 1737 and EAGLE 2000 glass, respectively.

Represent results are shown in FIGS. 5A (1737 $SiO_2$), 5B (EAGLE 2000 $SiO_2$), 6A (1737 $B_2O_3$), and 6B (EAGLE 2000 $B_2O_3$). The data in these figures is normalized to the nominal $SiO_2$ and $B_2O_3$ concentrations (see above) of the glass under study. Note the use of different vertical scales for the 1737 and EAGLE 2000 $SiO_2$ results. All of the data presented is for a 96 hour (4 day) heat treatment at the temperatures indicated.

Figure 7A:
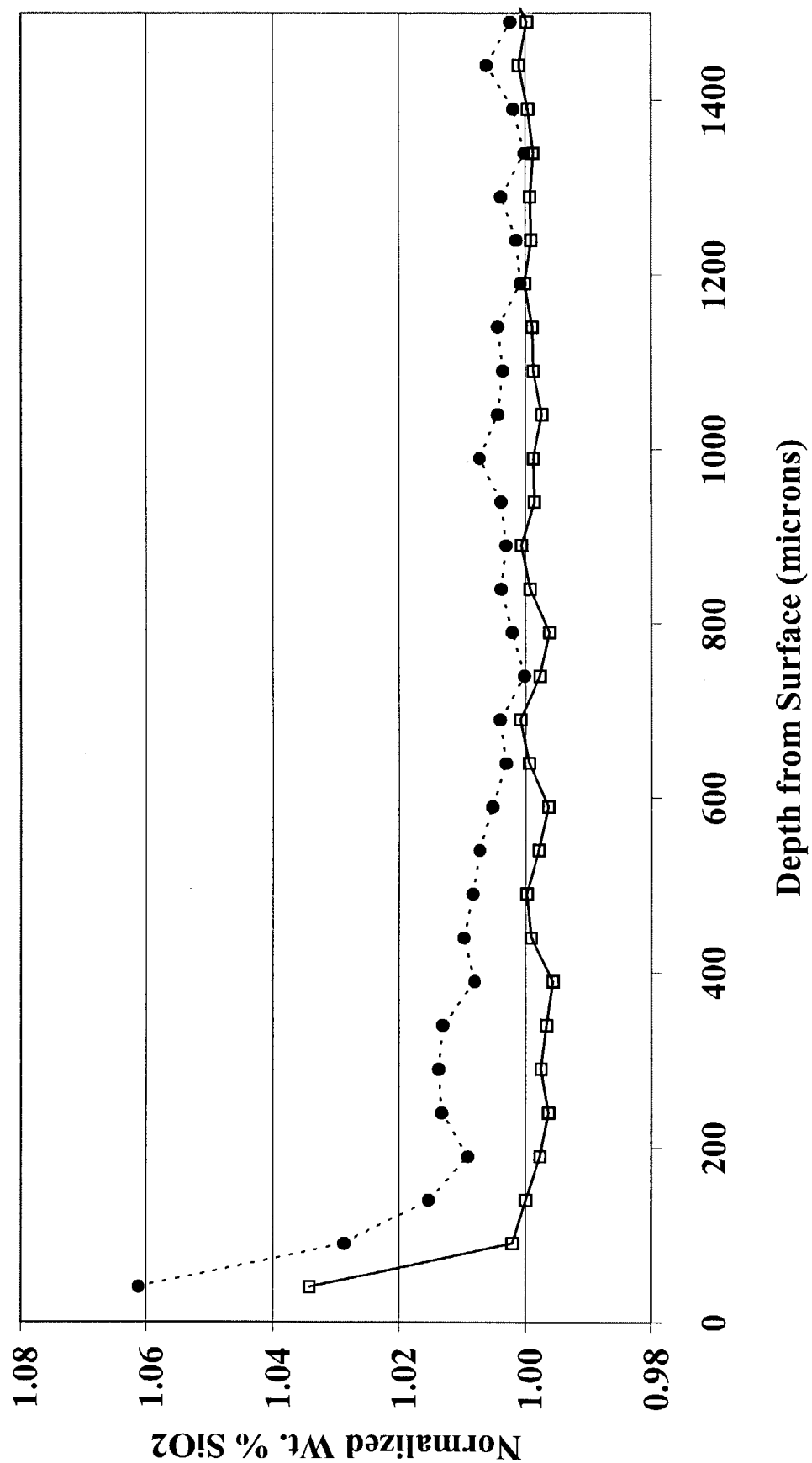
FIGS. 7A and 7B are plots showing surface enrichment of $SiO_2$ and surface depletion of $B_2O_3$, respectively, for 1737 glass (open data points) and EAGLE 2000 glass (solid data points).
Figure 7B:
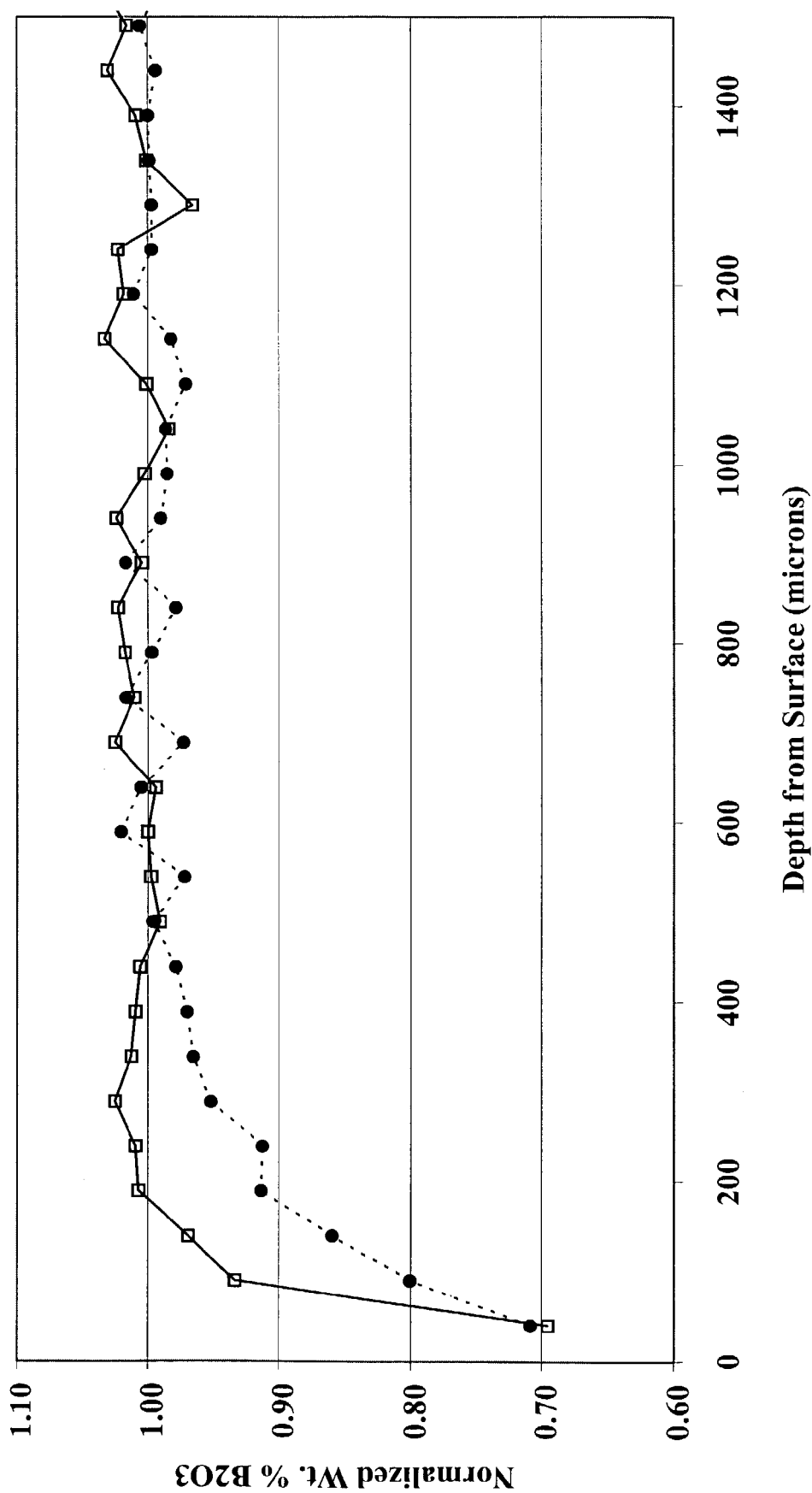

The greater enrichment of $SiO_2$ and the greater loss of $B_2O_3$ for EAGLE 2000 glass compared to 1737 glass is evident from these graphs. Moreover, the variation from bulk composition extends much farther from the surface for the EAGLE 2000 glass than for the 1737 glass. This later effect can be seen most clearly in FIGS. 7A and 7B which show, respectively, $SiO_2$ enrichment and $B_2O_3$ depletion at 96 hours for a treatment at 1250° C. for 1737 glass (open data points) and EAGLE 2000 (solid data points).

Figure 5B:
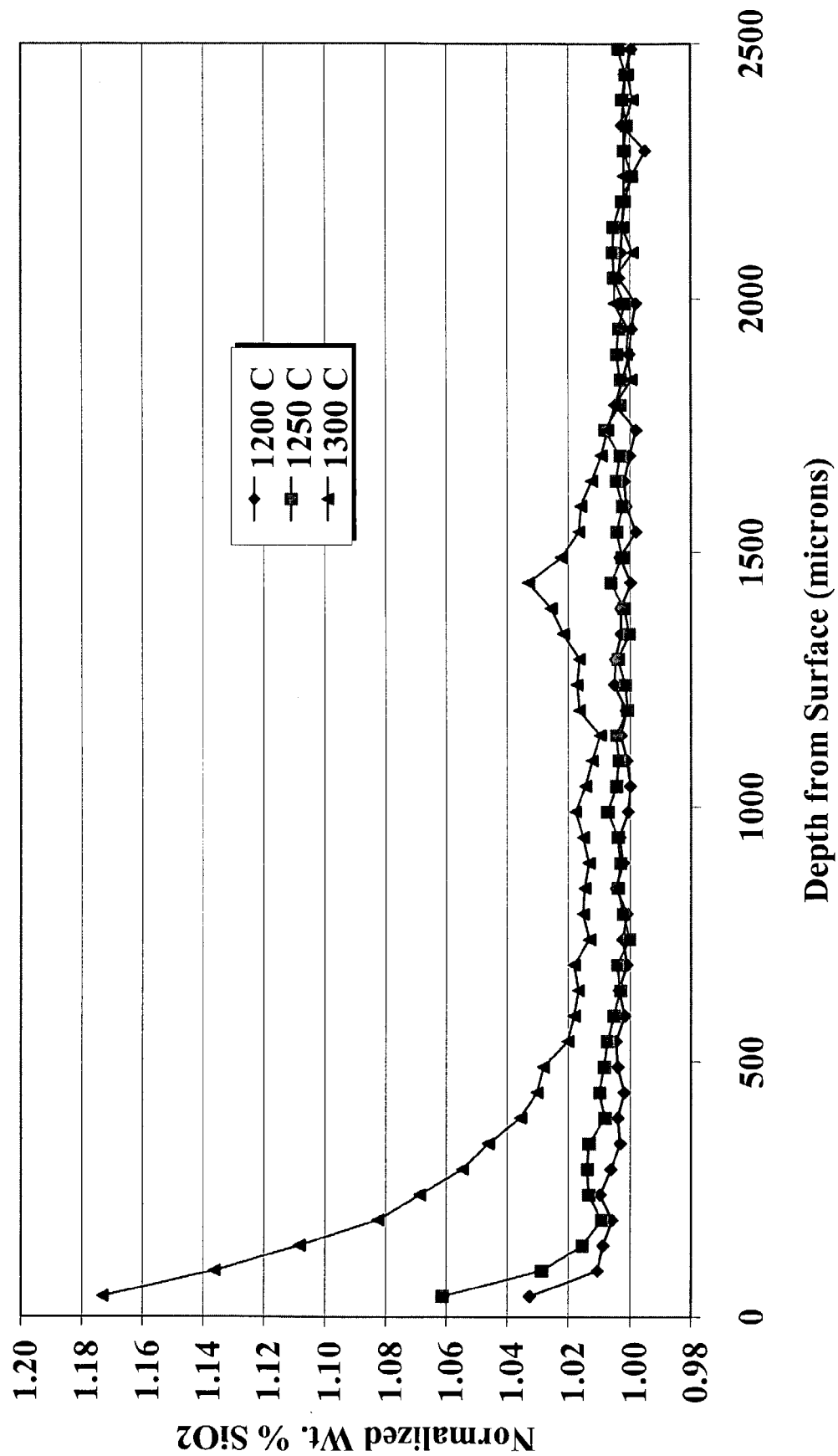
Figure 6A:
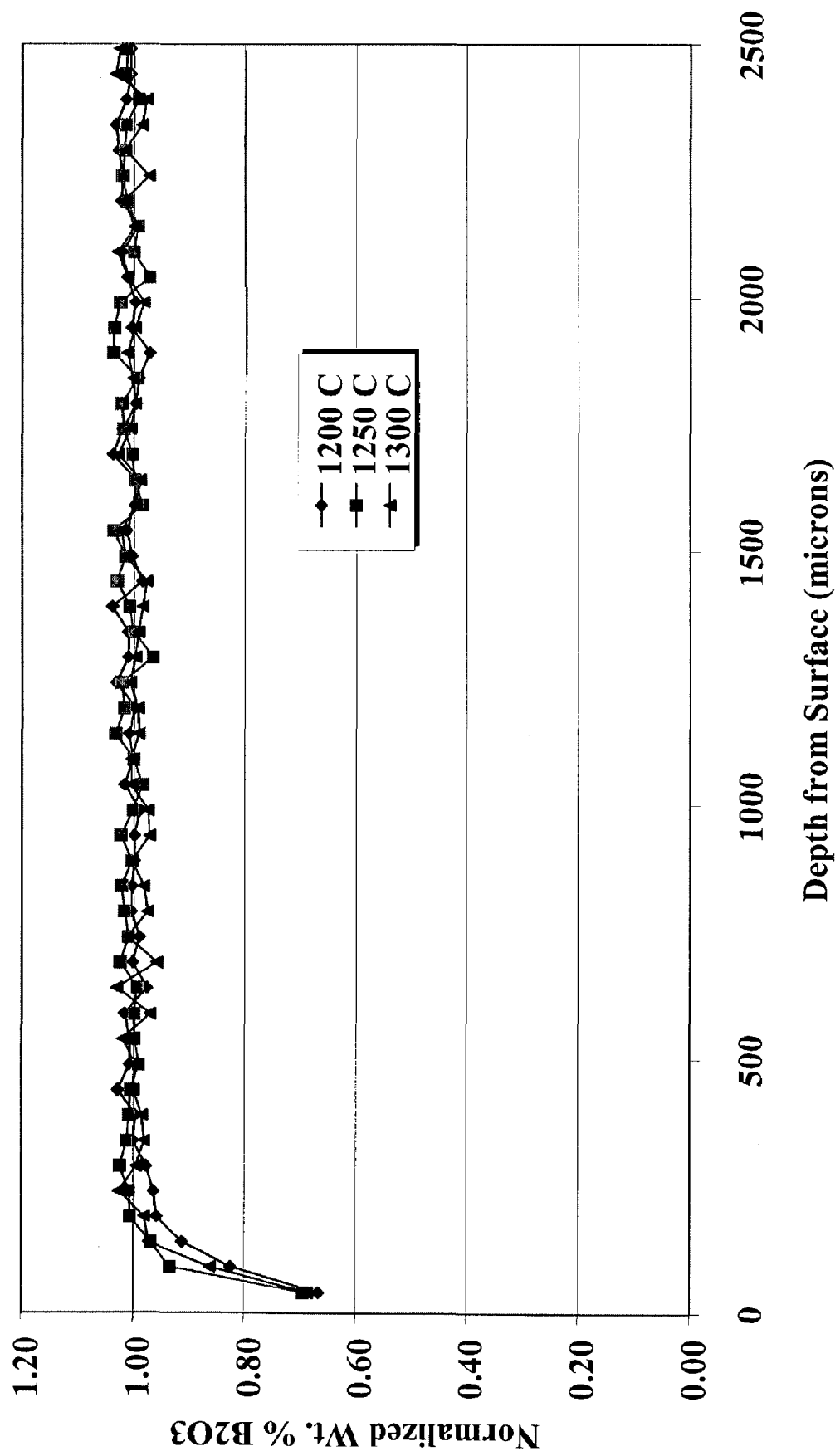
FIGS. 6A and 6B are plots showing surface depletion of $B_2O_3$ for 1737 and EAGLE 2000 glass, respectively.
Figure 6B:
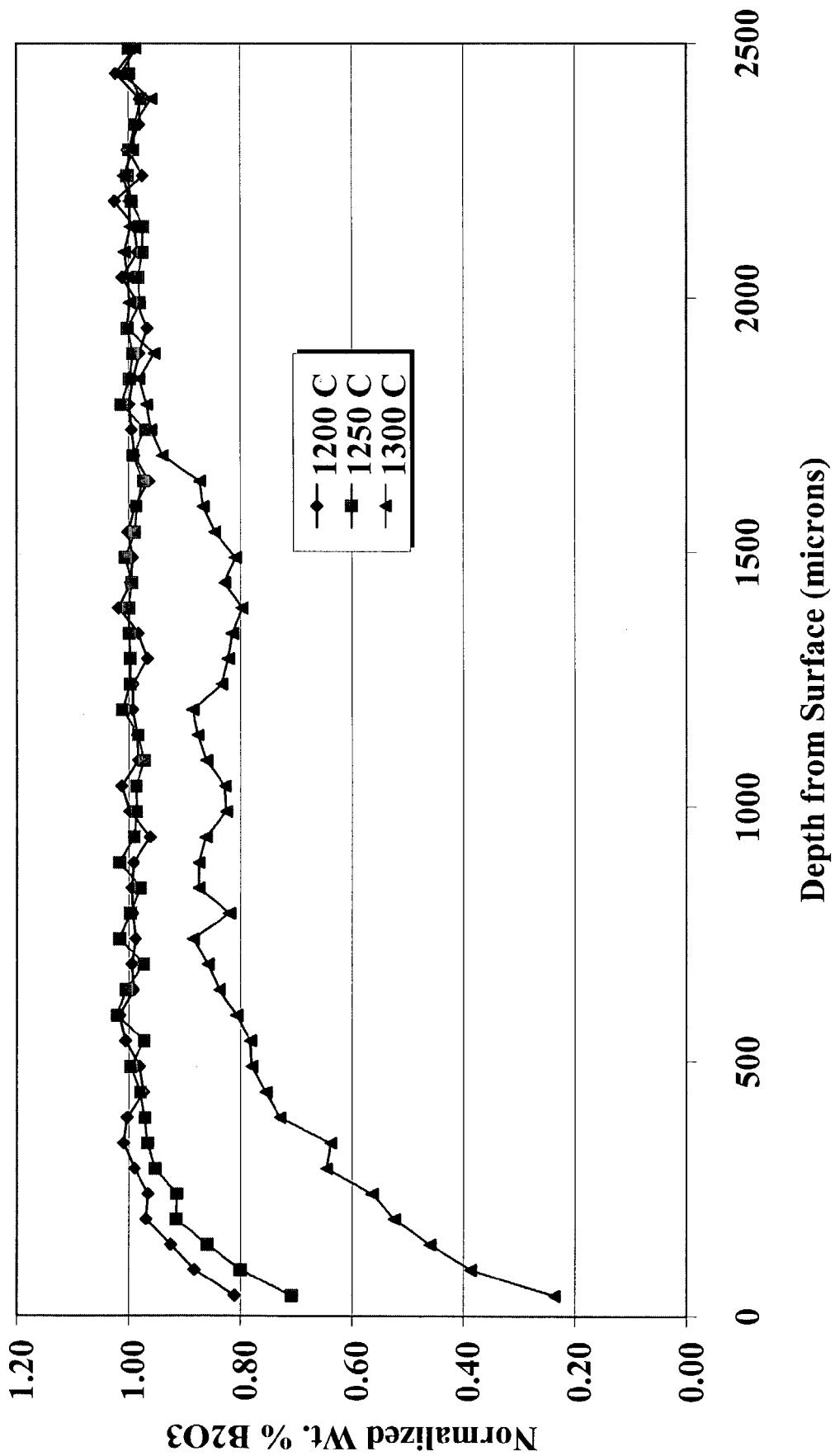

An examination of FIGS. 5B and 6B show that the silica enrichment and boron depletion are temperature dependent, with the levels of enrichment and depletion being especially great at 1300° C.

FIG. 7C is a photomicrograph of the top surface of a sample of EAGLE 2000 glass prepared as described above and held in the resistance heated furnace for 96 hours at 1300° C. The presence of crystals on the surface is evident. For comparison, FIG. 7D shows the crystal-free surface of a sample of 1737 glass treated in the same manner. Surface crystallization is also observed for EAGLE 2000 glass after 96 hour heat treatments at 1200° C. and 1250° C., but again not for 1737 glass.

The surface crystallization test of FIGS. 7C and 7D provides a convenient way to identify devitrification sensitive glasses. Thus, in general terms, a devitrification sensitive glass is one which forms surface crystals when heat treated for 8 days at 1300° C. Using this test, EAGLE 2000 is a devitrification sensitive glass, while 1737 is not.

Although the experiments of FIGS. 5–7 are specifically concerned with EAGLE 2000 and 1737 glass, the results observed are generally applicable to other glass compositions and, in particular, to other devitrification-sensitive aluminoborosilicate glasses used to produce LCD substrates. The volatility of boron from alkali aluminoborosilicate glasses has been well documented in industrial melting applications. Glass which is stagnant at high temperatures is especially prone to a loss of boron and alkalis to the furnace atmosphere and a subsequent enrichment of the remaining glass in the non-volatile fraction of the composition. The loss of boron and alkalis leads to the formation of a surface layer highly enriched in silica. As the enrichment increases, the composition of this surface layer can migrate below its liquidus leading to the growth of cristobalite.

The data for 1737 glass set forth in FIGS. 5A, 6A, and 7, as well as the behavior of this glass during manufacture, shows that although 1737 exhibits some loss of $B_2O_3$ and some enrichment of $SiO_2$, the magnitude and spatial distribution of these changes for this glass are not sufficient to cause a serious devitrification problem as a result of a stagnant free surface between downcomer 19 and supply pipe 9. The data of FIGS. 5B, 6B, and 7 for EAGLE 2000, on the other hand, as well as the results of trial manufacturing tests, show that this glass is susceptible to this problem. In general terms, aluminoborosilicate glasses in which the $SiO_2$ concentration is equal to or greater than 60 wt. % and/or the $B_2O_3$ concentration is in the range of 9–10 wt. % or higher are the glasses which will be devitrification sensitive and will require the use of the present invention to address the problem of devitrification defects in the finished glass.

In outline, the present invention's solution to the devitrification problem for high silica and/or high boron glasses is based on selecting the position of downcomer 19 with respect to molten glass 33 so that the free surface of the molten glass undergoes sufficient activation to avoid levels of $SiO_2$ enrichment and/or $B_2O_3$ depletion that will lead to the production of cristobalite crystals in the finished glass.

Figure 9:
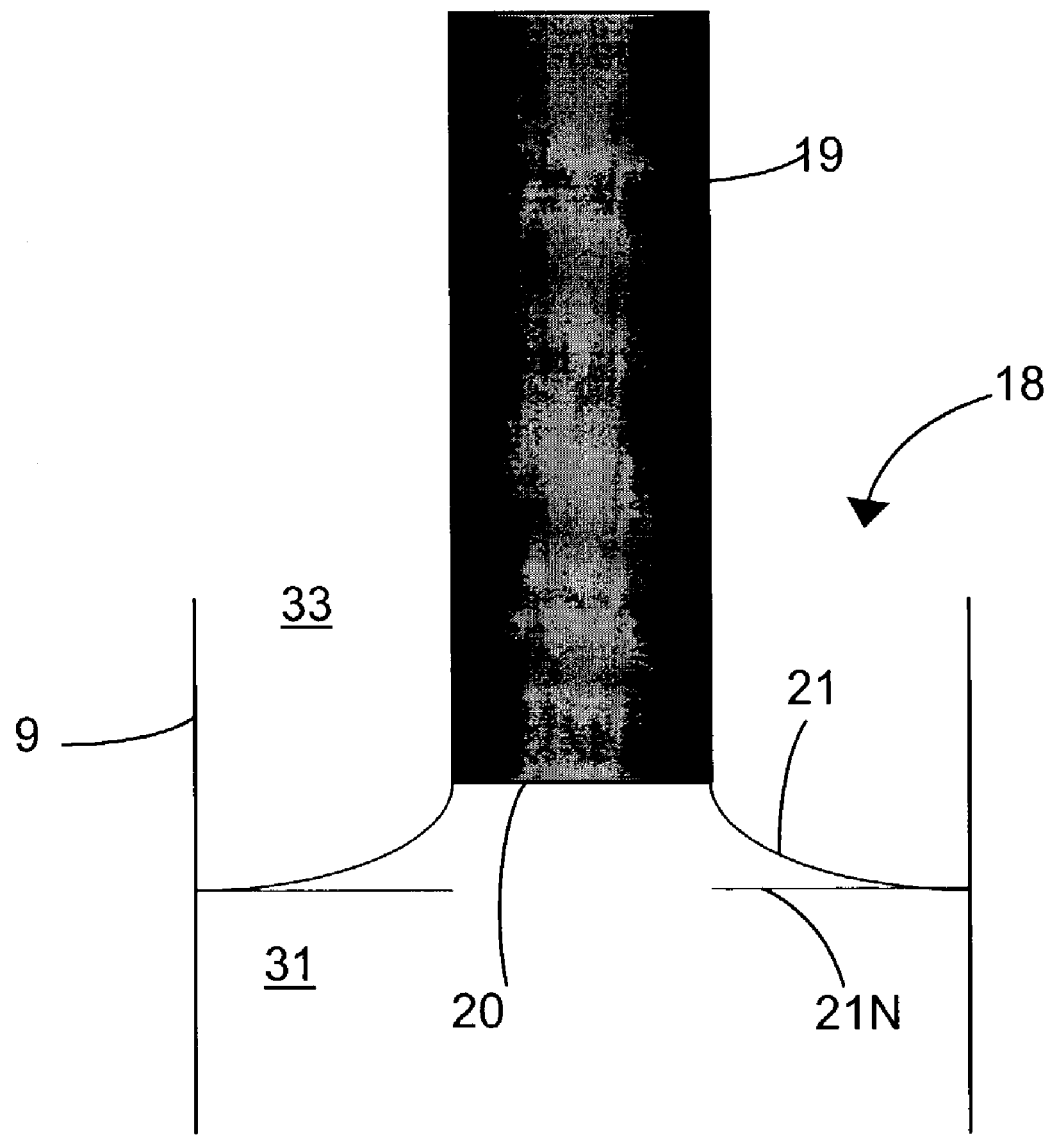
FIG. 9 is an expanded view of the junction between the downcomer and the supply pipe of FIG. 8.

One way of achieving such surface activation is to place the downcomer above nominal free surface 21N as shown in FIGS. 8 and 9. This creates a free surface 21 which lies above the nominal free surface. The glass which forms free surface 21 is continuously replaced with fresh glass and thus any enrichment of silica and/or depletion of boron oxide that may occur at the surface does not have an opportunity to reach levels where devitrification defects are created in the finished glass. In practice, raising the downcomer above nominal free surface 21 has been found to eliminate devitrification defects of the type shown in FIG. 4 from devitrification sensitive glass.

Figure 10:
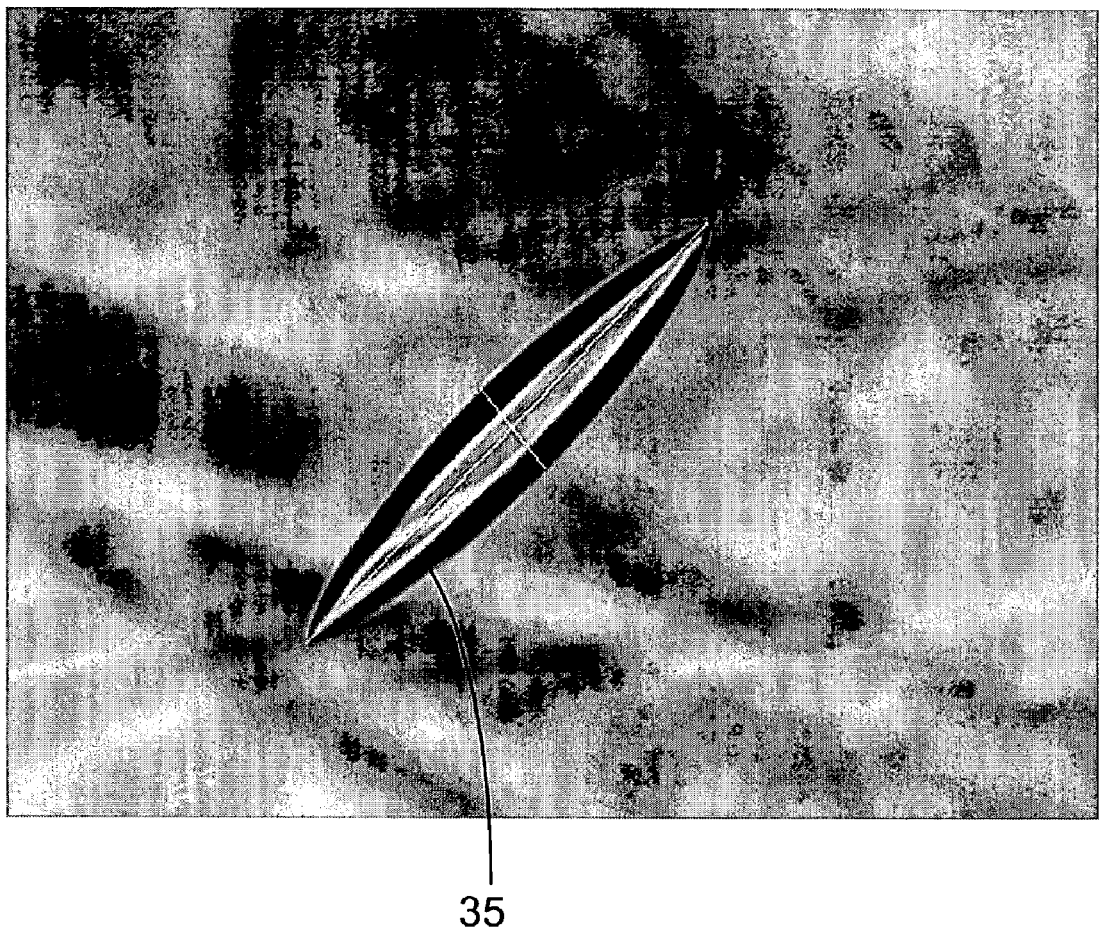
FIG. 10 is a photomicrograph of a gaseous defect (blister defect) of the type which the present invention addresses. The defect shown is representative of the type of blister defects seen at the fusion line for glass drawn to a thickness of approximately 0.7 millimeters. It has a long axis of 239 microns and a short axis of 42 microns. Larger and smaller dimensions are common for defects of this kind. The photograph was taken looking down at the glass sheet.

However, in accordance with the invention, it has been found that locating the exit end 20 of downcomer 19 above nominal free surface 21N can itself lead to defects in the finished glass. In this case, the defects are gaseous defects (blister defects) of the type shown in FIG. 10.

Although not wishing to be bound by any particular theory of operation, it is believed that these defects may be caused by the passage of molten glass over the edge of exit end 20 of downcomer 19 while that edge is exposed to gaseous atmosphere 33. Because the edge always has some roughness, it can locally deform (locally cut) the molten glass. As those deformations heal, they can entrap small amounts of the gaseous atmosphere (small bubbles of gas) which are unable to escape from the molten glass and thus end up as blister defects in the finished glass. Another possible mechanism for the formation of blister defects is folding or lapping of the molten glass as it exits the downcomer. This effect usually requires a substantial elevation of the exit end of the downcomer above the nominal free surface of the molten glass.

Although on their face, these blister defects are plainly a problem, from an operational point of view, they are an advantage of the invention. This is so because they provide a procedure for identifying a desirable location for the exit end of the downcomer relative to the nominal free surface of the molten glass.

In accordance with this procedure, one can begin the search for a suitable location for the exit end of the downcomer with the exit end being, for example, in a submerged condition which produces devitrification defects in a devitrification sensitive glass. (The exit end of the downcomer can, of course, be at a higher location at the beginning of the search procedure based on the teachings herein.) The downcomer is then moved upward until blister defects appear in the finished glass. At this location, the problem of devitrification defects will be eliminated, although, of course, the problem of blister defects will exist. Then, the downcomer is moved downward until the blister defects disappear in the finished glass. In practice, it has been found that this location (or even some further downward movement) does not result in the reappearance of devitrification defects in devitrification sensitive glass. Accordingly, in this way, both devitrification defects and blister defects are effectively eliminated from devitrification sensitive glasses.

Figure 11:
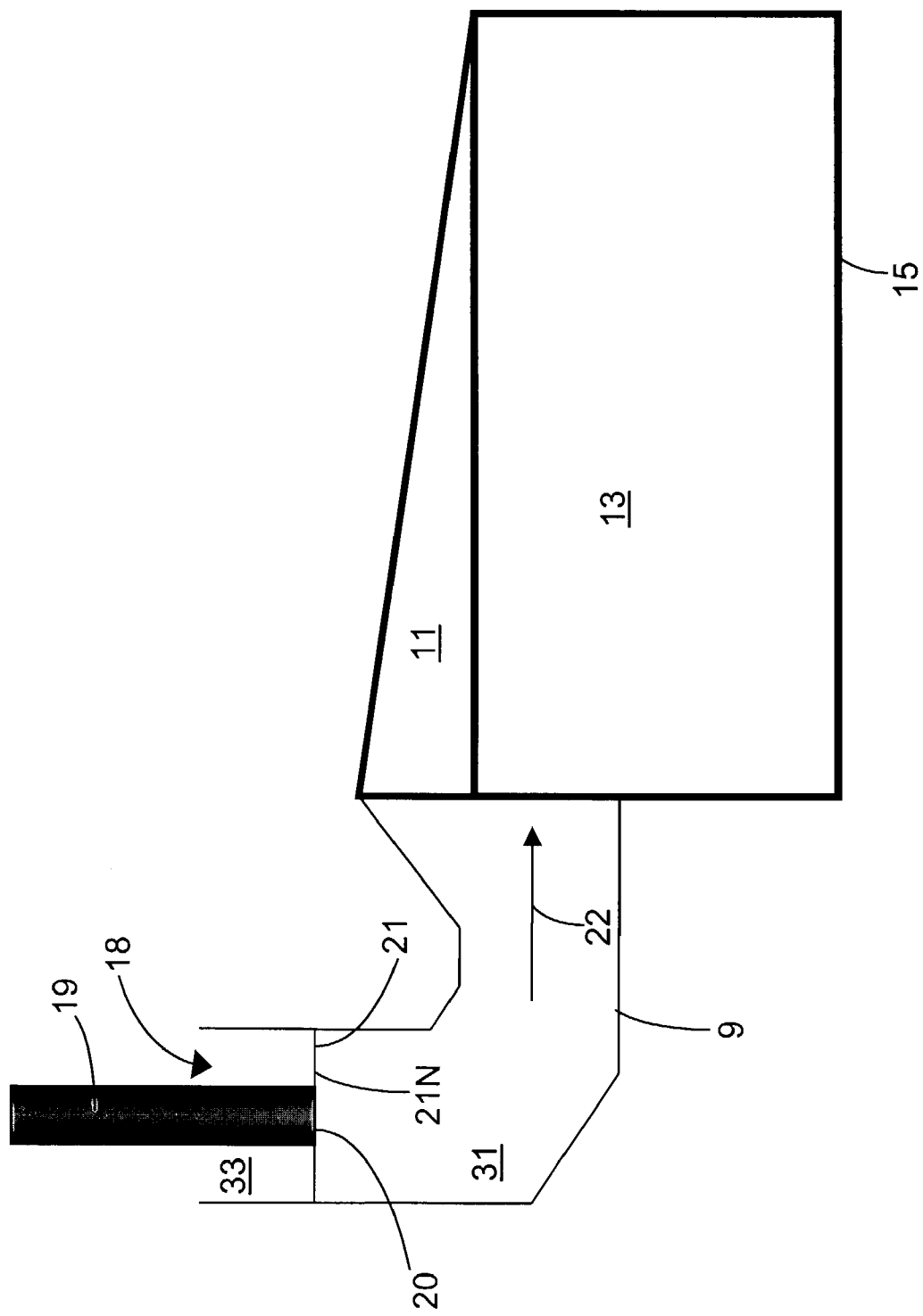
FIG. 11 is a schematic diagram illustrating the junction between a downcomer and a supply pipe where the exit end of the downcomer is essentially at the nominal free surface of the molten glass in the supply pipe.
Figure 12:
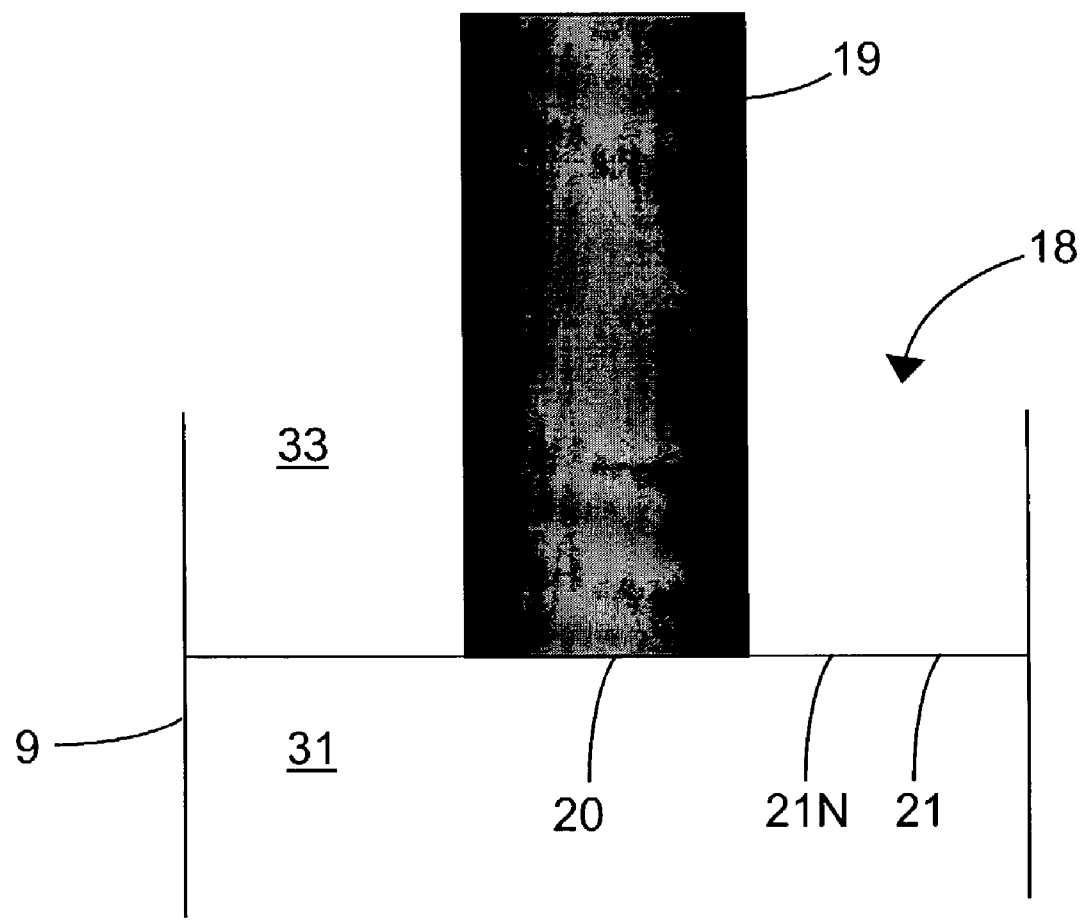
FIG. 12 is an expanded view of the junction between the downcomer and the supply pipe of FIG. 11.

The downward movement of the downcomer to eliminate blister defects can bring the exit end of the downcomer into a location where it is essentially at the free surface, as illustrated in FIGS. 11 and 12, or even below the free surface, e.g., below the free surface by approximately 5 millimeters. Although fresh glass does not overflow the free surface when the exit end of the downcomer is submerged, the free surface can still be sufficiently activated through mechanical and/or diffusional forces to avoid the formation of devitrification defects.

Although the at-the-free-surface or the below-the-free-surface configurations can be used, the non-submerged configuration of FIGS. 8 and 9 is preferred, provided the spacing between the exit end of the downcomer and the nominal free surface of the molten glass is not too great. In practice, a spacing of 10–30 millimeters, preferably 15–25 millimeters, e.g., approximately 20 millimeters, has been found to work successfully. It is to be understood that these are representative spacings, with the particular spacing used for any specific application of the invention being a function of the equipment used, as well as the viscosity of the molten glass. Based on the present disclosure, a suitable spacing for any particular equipment configuration and molten glass viscosity can be readily determined by persons skilled in the art.

Although specific embodiments of the invention have been described and illustrated, it is to be understood that modifications can be made without departing from the invention's spirit and scope. For example, the above procedures for identifying a desirable location for the exit end of the downcomer need not be used each time a fusion process is put into operation, but rather knowledge from prior use of the invention can be employed to immediately set the downcomer at a desired location without repeating the procedures which identified that location. Similarly, although the most valuable applications of the invention are in the manufacture of devitrification sensitive glasses by the fusion process, the invention can also be used with glasses that are not devitrification sensitive with no adverse effects and potentially beneficial effects in expanding the operating range of the process.

A variety of other modifications which do not depart from the scope and spirit of the invention will be evident to persons of ordinary skill in the art from the disclosure herein. The following claims are intended to cover the specific embodiments set forth herein as well as such modifications, variations, and equivalents.

What is claimed is:

1. A molten glass delivery system for use in producing sheet glass by a fusion process comprising:
    (a) a first conduit which has a first characteristic cross-sectional dimension; and
    (b) a second conduit which has an exit end and a second characteristic cross-sectional dimension;
    wherein:
    (i) the first conduit receives molten glass from the second conduit;
    (ii) a portion of the first conduit surrounds a portion of the second conduit;
    (iii) the first characteristic cross-sectional dimension is larger than the second characteristic cross-sectional dimension so that a free surface of molten glass is formed between the first and second conduits; and
    (iv) the first and second conduits are positioned relative to one another so that the spatial relationship between the exit end of the second conduit and the free surface of the molten glass results in neither substantial numbers of devitrification defects nor substantial numbers of blister defects in the finished sheet glass for a glass that is devitrification sensitive,
    and wherein:
    (A) the portion of the second conduit which is surrounded by the first conduit is substantially vertically oriented;
    (B) the molten glass between the first and second conduits defines a nominal free surface; and
    (C) the exit end of the second conduit is located in a spatial range that extends from 5 millimeters below to 30 millimeters above said nominal free surface.

2. The delivery system of claim 1 wherein the exit end of the second conduit is above said nominal free surface and is spaced between 10 millimeters and 30 millimeters of said surface.

3. The delivery system of claim 1 wherein the exit end of the second conduit is above said nominal free surface and is spaced between 15 millimeters and 25 millimeters of said surface.

4. A method for providing molten glass to apparatus which produces sheet glass by a fusion process, said method comprising:
    (a) providing a first conduit which has a first characteristic cross-sectional dimension;
    (b) providing a second conduit which has an exit end and a second characteristic cross-sectional dimension, said second characteristic cross-sectional dimension being smaller than said first characteristic cross-sectional dimension;
    (c) nesting a portion of the second conduit within a portion of the first conduit;
    (d) flowing molten glass out of the second conduit and into the first conduit, said molten glass forming a free surface between the first and second conduits; and
    (e) selecting the relative locations of the first and second conduits so that the spatial relationship between the exit end of the second conduit and the free surface of the molten glass results in neither substantial numbers of devitrification defects nor substantial numbers of blister defects in the finished sheet glass for glass that is devitrification sensitive.

5. The method of claim 4 wherein the nested portion of the second conduit is substantially vertically oriented.

6. The method of claim 5 wherein the exit end of the second conduit is substantially at the free surface.

7. The method of claim 5 wherein the exit end of the second conduit is below the free surface.

8. The method of claim 5 wherein the molten glass between the first and second conduits defines a nominal free surface and step (e) comprises:
    (i) moving the first and second conduits apart so that the exit end of the second conduit is sufficiently above the nominal free surface so that substantial numbers of blister defects appear in the finished sheet glass, said moving comprising moving the first conduit, the second conduit, or both the first and second conduits; and
    (ii) moving the first and second conduits together until substantial numbers of blister defects no longer appear in the finished sheet glass, said moving comprising moving the first conduit, the second conduit, or both the first and second conduits.

9. The method of claim 8 where step (e) comprises the further step of moving the first and second conduits together beyond the point where substantial numbers of blister defects no longer appear in the finished sheet glass but not so far as to cause substantial numbers of devitrification defects to appear in the finished sheet glass for glass that is devitrification sensitive, said moving comprising moving the first conduit, the second conduit, or both the first and second conduits.

10. The method of claim 5 wherein the molten glass between the first and second conduits defines a nominal free surface and the exit end of the second conduit is above said nominal free surface.

11. The method of claim 10 wherein the exit end of the second conduit is spaced between 10 millimeters and 30 millimeters of the nominal free surface.

12. The method of claim 10 wherein the exit end of the second conduit is spaced between 15 millimeters and 25 millimeters of the nominal free surface.

13. The method of claim 4 wherein the molten glass has a bulk composition which comprises at least 60 wt. % $SiO_2$.

14. The method of claim 4 wherein the molten glass has a bulk composition which comprises at least 9 wt. % $B_2O_3$.

15. The method of claim 4 wherein the molten glass has a bulk composition which comprises at least 60 wt. % $SiO_2$ and at least 9 wt. % $B_2O_3$.

16. The method of claim 4 wherein the sheet glass is used to make a substrate.

17. A method for producing sheet glass by a fusion process wherein:
    (a) said fusion process employs:
        (i) a collection trough;
        (ii) a supply pipe which provides molten glass to the collection trough; and
        (iii) a downcomer which supplies molten glass to the supply pipe, said downcomer having an exit end; and
    (b) said sheet glass comprises at least 60 wt. % $SiO_2$ and at least 9 wt. % $B_2O_3$;
said method comprising transferring molten glass from the downcomer to the supply pipe wherein:

(i) molten glass between the downcomer and the supply pipe defines a nominal free surface; and (ii) the spatial relationship between the exit end of the downcomer and the nominal free surface results in neither substantial numbers of devitrification defects nor substantial numbers of blister defects in the finished sheet glass, where the devitrification defects comprise cristobalite crystals.

18. The method of claim 17 wherein the sheet glass is used to make a substrate.

19. The method of claim 18 wherein the substrate is a substrate for a liquid crystal display.

20. A method of selecting the relative locations of first and second conduits in a molten glass delivery system wherein:

(a) the first conduit has a first characteristic cross-sectional dimension;

(b) the second conduit has an exit end and a second characteristic cross-sectional dimension, said second characteristic cross-sectional dimension being smaller than said first characteristic cross-sectional dimension;

(c) a portion of the second conduit is nested within a portion of the first conduit;

(d) molten glass flows out of the second conduit and into the first conduit and forms a free surface between the first and second conduits;

(e) the molten glass between the first and second conduits defines a nominal free surface; and (f) the nested portion of the second conduit is substantially vertically oriented;

said method comprising:

(i) moving the first and second conduits apart so that the exit end of the second conduit is sufficiently above the nominal free surface so that substantial numbers of blister defects appear in the finished sheet glass, said moving comprising moving the first conduit, the second conduit, or both the first and second conduits; and (ii) moving the first and second conduits together until substantial numbers of blister defects no longer appear in the finished sheet glass, said moving comprising moving the first conduit, the second conduit, or both the first and second conduits.

21. The method of claim 20 further comprising moving the first and second conduits together beyond the point where substantial numbers of blister defects no longer appear in the finished sheet glass, said moving comprising moving the first conduit, the second conduit, or both the first and second conduits.

22. The method of claim 20 or 21 wherein the relative locations of first and second conduits are selected so that the exit end of the second conduit is positioned above said nominal free surface.

23. The method of claim 22 wherein the exit end of the second conduit is spaced between 10 millimeters and 30 millimeters of the nominal free surface.

24. The method of claim 22 wherein the exit end of the second conduit is spaced between 15 millimeters and 25 millimeters of the nominal free surface.

25. The method of claim 20 or 21 wherein the relative locations of first and second conduits are selected so that the exit end of the second conduit is positioned substantially at the free surface.

26. The method of claim 20 or 21 wherein the relative locations of first and second conduits are selected so that the second conduit is positioned below the free surface.

27. A molten glass delivery system for use in producing sheet glass by a fusion process comprising:

(a) a first conduit which has a first characteristic cross-sectional dimension; and (b) a second conduit which has an exit end and a second characteristic cross-sectional dimension;

wherein:

(i) the first conduit receives molten glass from the second conduit;

(ii) a portion of the first conduit surrounds a portion of the second conduit;

(iii) the first characteristic cross-sectional dimension is larger than the second characteristic cross-sectional dimension so that a free surface of molten glass is formed between the first and second conduits; and (iv) the first and second conduits are positioned relative to one another so that the spatial relationship between the exit end of the second conduit and the free surface of the molten glass results in neither substantial numbers of devitrification defects nor substantial numbers of blister defects in the finished sheet glass for a glass that is devitrification sensitive, and wherein:

(A) the portion of the second conduit which is surrounded by the first conduit is substantially vertically oriented;

(B) the molten glass between the first and second conduits defines a nominal free surface; and (C) the exit end of the second conduit is located in a spatial range that extends from approximately 5 millimeters below to essentially at the nominal free surface.

* * * * *